United States Patent
Hanaoka et al.

(10) Patent No.: US 11,777,355 B2
(45) Date of Patent: Oct. 3, 2023

(54) STATOR AND ELECTRIC ROTATING MACHINE

(71) Applicant: SUBARU CORPORATION, Tokyo (JP)

(72) Inventors: Masatoshi Hanaoka, Tokyo (JP); Nobuhiko Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 467 days.

(21) Appl. No.: 16/909,717

(22) Filed: Jun. 23, 2020

(65) Prior Publication Data
US 2021/0099039 A1   Apr. 1, 2021

(30) Foreign Application Priority Data

Sep. 26, 2019 (JP) .................................. 2019-174853

(51) Int. Cl.
*H02K 3/28* (2006.01)
*H02K 21/14* (2006.01)
*H02K 1/16* (2006.01)

(52) U.S. Cl.
CPC .................. *H02K 3/28* (2013.01); *H02K 1/16* (2013.01); *H02K 21/14* (2013.01)

(58) Field of Classification Search
CPC .. H02K 3/04; H02K 3/12; H02K 3/14; H02K 3/28

See application file for complete search history.

(56) References Cited

U.S. PATENT DOCUMENTS 7,268,455 B2 * 9/2007 Kouda ..................... H02K 3/28
                                                            310/201
10,153,674 B2 * 12/2018 Tsuiki ..................... H02K 3/28
(Continued)

FOREIGN PATENT DOCUMENTS

DE      102018114048 A1 * 12/2018 ............... H02K 3/12
JP      S 49-13283          3/1974
JP      A 2001-037132       2/2001
(Continued)

OTHER PUBLICATIONS

Machine translation of DE 102018114048 A1 (Year: 2018).*
Japanese Office Action, dated May 30, 2023, in Japanese Application No. 2019-1748553 and English Translation thereof.

*Primary Examiner* — Quyen P Leung
*Assistant Examiner* — Minki Chang
(74) *Attorney, Agent, or Firm* — McGinn I.P. Law Group, PLLC.

(57) ABSTRACT

A stator to be provided in an electric rotating machine includes a stator core and a distributed winding coil. The stator core has a plurality of slots. The distributed winding coil includes a plurality of segment coils coupled to each other. Each of the segment coils is accommodated across a pair of slots out of the plurality of slots. The distributed winding coil has a coil structure including a plurality of parallel coils coupled to each other in series. Each of the parallel coils includes two or more of the segment coils. The two or more segment coils are coupled to each other in parallel and are accommodated across the same pair of slots out of the plurality of slots. The two or more segment coils included in each of the parallel coils are disposed adjacent to each other in a radial direction in the same pair of slots.

20 Claims, 13 Drawing Sheets

(56) References Cited

U.S. PATENT DOCUMENTS

2004/0041491 A1*  3/2004  Gorohata ................. H02K 3/12
                                                                310/187
2019/0334393 A1* 10/2019  Kim .................... F04D 25/0646

FOREIGN PATENT DOCUMENTS

| JP | 3864878 B2 | 1/2007 |
| JP | 4453669 B2 | 4/2010 |
| JP | A 2010-239741 | 10/2010 |
| JP | A 2014-212638 | 11/2014 |
| WO | WO 2008-020471 A1 | 2/2008 |

* cited by examiner

STATOR AND ELECTRIC ROTATING MACHINE

CROSS-REFERENCE TO RELATED APPLICATIONS

The present application claims priority from Japanese Patent Application No. 2019-174853 filed on Sep. 26, 2019, the entire contents of which are hereby incorporated by reference.

BACKGROUND

The technology relates to a stator and an electric rotating machine including the stator.

An electric rotating machine, such as an electric motor or an electric generator, is provided with a stator that generates magnetic field. To achieve increased torque and downsizing of the electric rotating machine, Japanese Patent Nos. 4453669 and 3864878 each disclose an electric rotating machine that uses a stator coil including a plurality of segment coils. In such an electric rotating machine, the segment coils each bent into a U-like shape are inserted into slots of a stator core, and the segment coils are coupled to each other as one electric conductor.

SUMMARY

An aspect of the technology provides a stator to be provided in an electric rotating machine. The stator includes a stator core and a distributed winding coil. The stator core has a plurality of slots. The distributed winding coil includes a plurality of segment coils coupled to each other. Each of the segment coils is accommodated across a pair of slots out of the plurality of slots. The distributed winding coil has a coil structure including a plurality of parallel coils coupled to each other in series. Each of the parallel coils includes two or more of the segment coils. The two or more segment coils are coupled to each other in parallel and are accommodated across the same pair of slots out of the plurality of slots. The two or more segment coils included in each of the parallel coils are disposed adjacent to each other in a radial direction in the same pair of slots.

An aspect of the technology provides an electric rotating machine including a stator and a rotor. The stator includes a stator core and a distributed winding coil. The stator core has a plurality of slots. The distributed winding coil includes a plurality of segment coils coupled to each other. Each of the segment coils is accommodated across a pair of slots out of the plurality of slots. The distributed winding coil has a coil structure including a plurality of parallel coils coupled to each other in series. Each of the parallel coils includes two or more of the segment coils. The two or more segment coils are coupled to each other in parallel and are accommodated across the same pair of slots out of the plurality of slots. The two or more segment coils included in each of the parallel coils are disposed adjacent to each other in a radial direction in the same pair of slots. The rotor is accommodated in the stator core and is rotatable with respect to the stator. The rotor includes a rotor shaft and a rotor core. The rotor core is attached on an outer circumference of the rotor shaft and includes a plurality of permanent magnets arranged in a circumferential direction.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
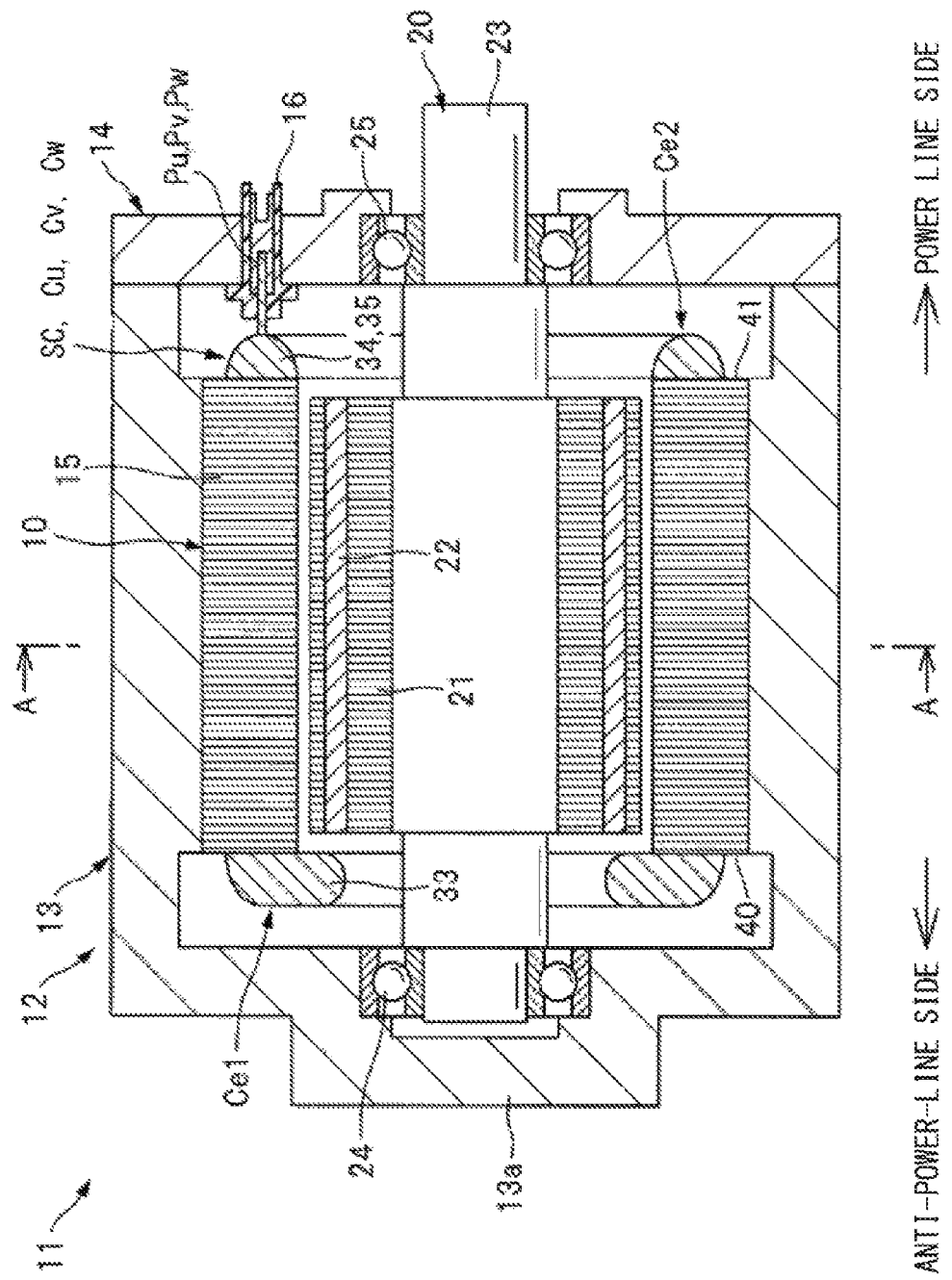
FIG. 1 is a cross-sectional view of an exemplary electric rotating machine including a stator according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

The following description describes, as an example of an electric rotating machine 11 to be provided with a stator 10 according to an example embodiment of the technology, a three-phase synchronous motor generator to be mounted on an electric vehicle or a hybrid electric vehicle, for example. However, without being limited to this example, the electric rotating machine 11 may be any electric rotating machine, as long as the electric rotating machine includes a stator including a distributed winding coil.

[Structure of Electric Rotating Machine]

FIG. 1 is a cross-sectional view of the exemplary electric rotating machine 11 including the stator 10 according to an example embodiment of the technology. As illustrated in FIG. 1, the electric rotating machine 11 serving as a motor generator may include a motor housing 12. The motor housing 12 may include a housing body 13 and an end cover 14. The housing body 13 may be shaped like a bottomed cylinder. The end cover 14 may close an open end of the housing body 13. The stator 10 fixed in the housing body 13 includes a cylindrical stator core 15 and a three-phase stator coil SC (hereinafter referred to as three-phase coil SC). The stator core 15 may include a plurality of silicon steel plates, for example. The three-phase coil SC may be attached to the stator core 15. The end cover 14 may be provided with a high-voltage connector 16 to be coupled to an inverter (not illustrated), for example. To the high-voltage connector 16 may be coupled power line terminals Pu, Pv, and Pw extending from the three-phase coil SC.

In the middle of the stator core 15, a columnar rotor 20 is accommodated rotatably. The rotor 20 includes a cylindrical rotor core 21, a plurality of permanent magnets 22, and a rotor shaft 23. The rotor core 21 may include a plurality of silicon steel plates, for example. The permanent magnets 22 may be provided in the rotor core 21. The rotor shaft 23 may be fixed in the middle of the rotor core 21. One end of the rotor shaft 23 may be supported by a bearing 24, and the other end of the rotor shaft 23 may be supported by a bearing 25. The bearing 24 may be provided in a wall 13a of the housing body 13. The bearing 25 may be provided in the end cover 14.

[Structure of Stator]

Figure 2:
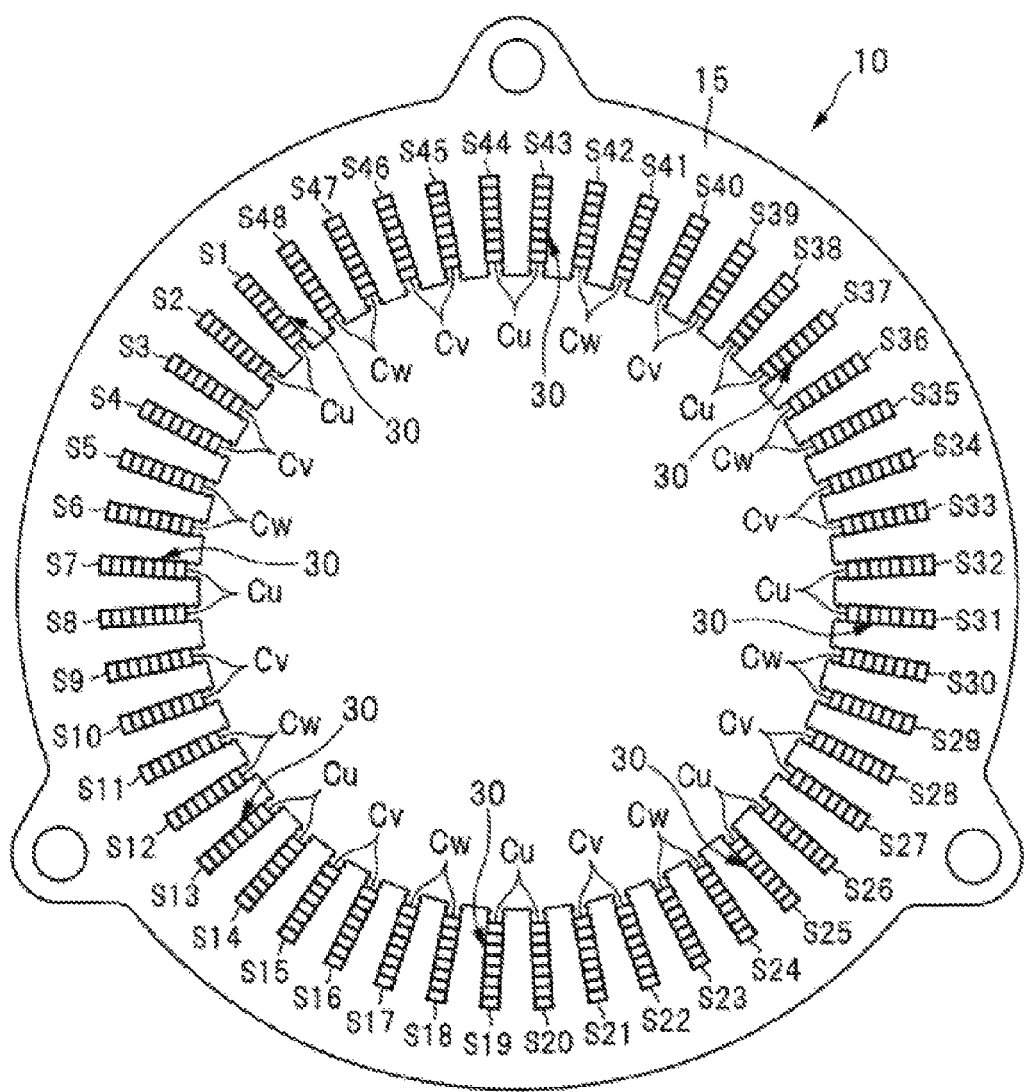
FIG. 2 is a cross-sectional view of the stator taken along line A-A in FIG. 1.
Figure 3:
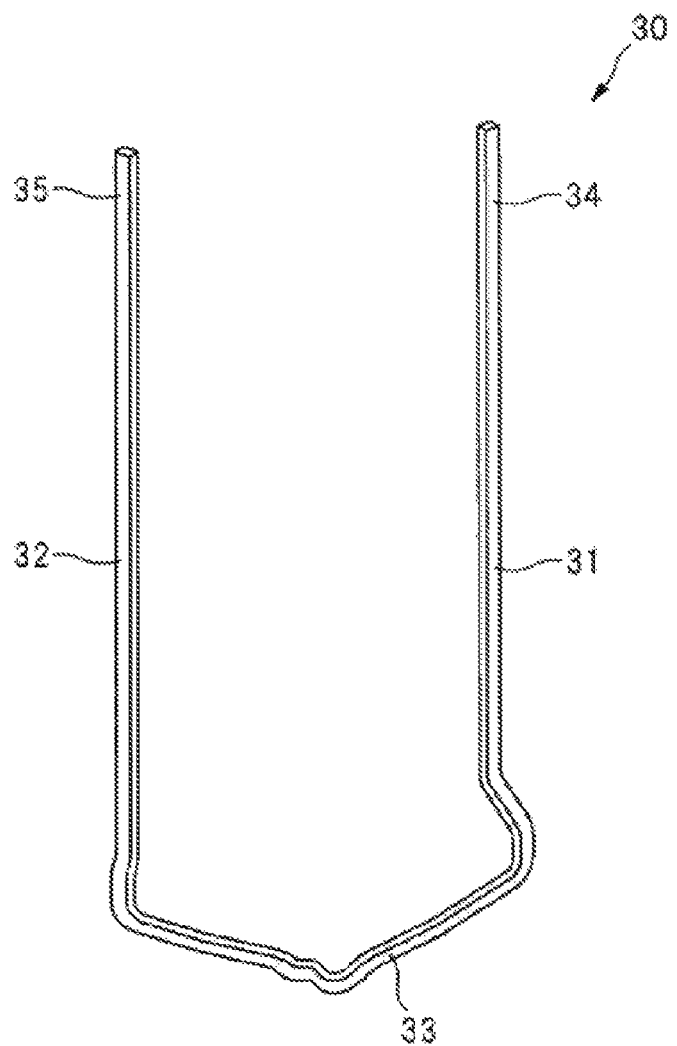
FIG. 3 is a perspective view of exemplary segment coils.
Figure 4:
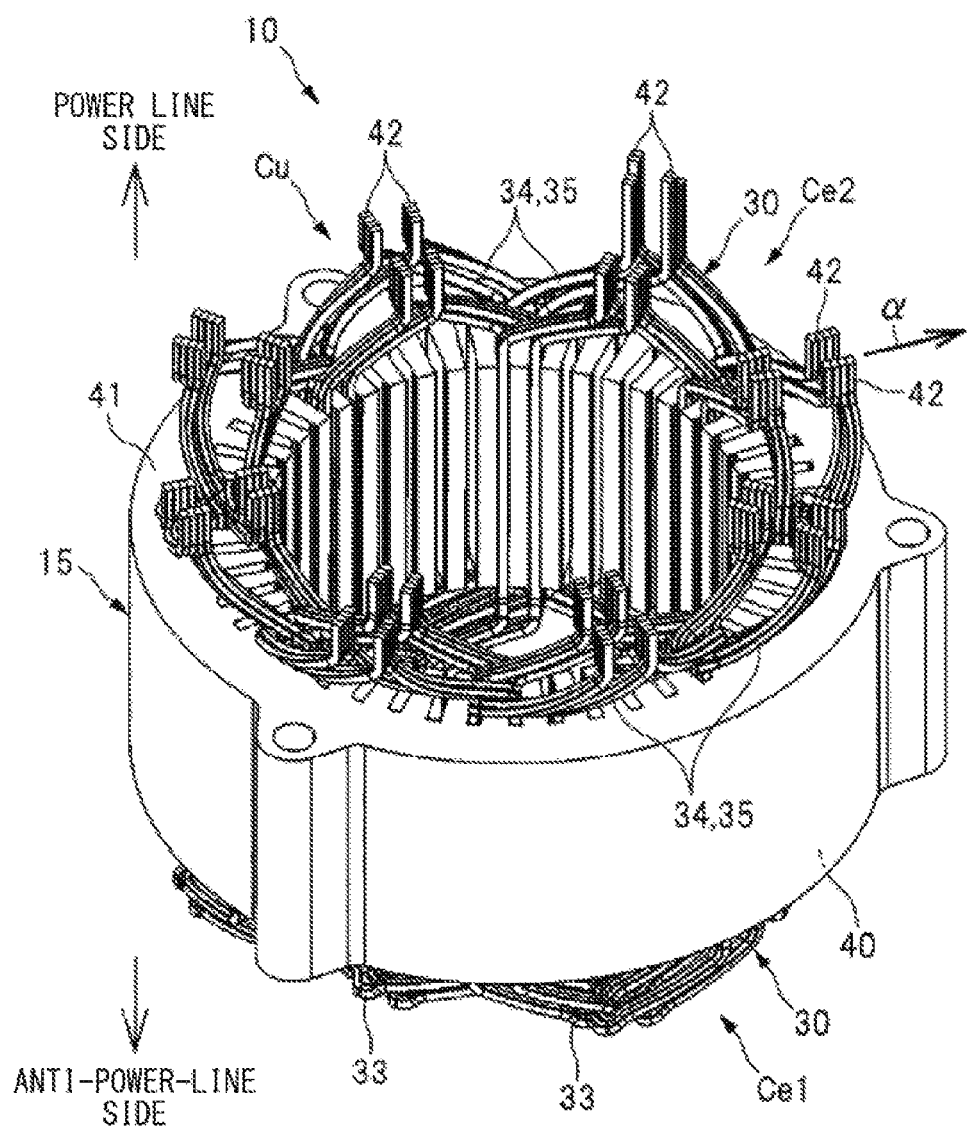
FIG. 4 is a perspective view of a stator core provided with a U-phase distributed winding coil (U-phase coil).
Figure 5:
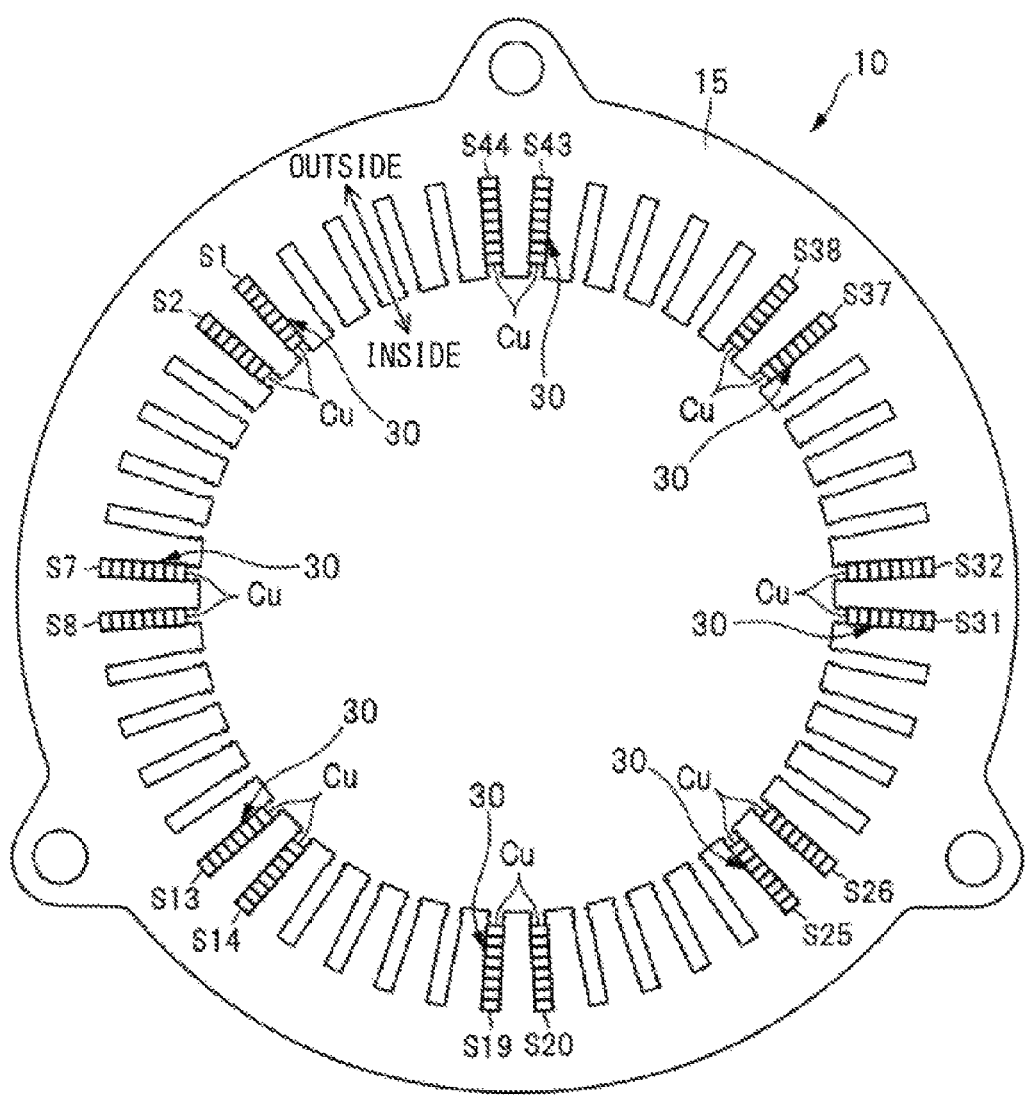
FIG. 5 is a cross-sectional view of the stator core provided with the U-phase coil.
Figure 6:
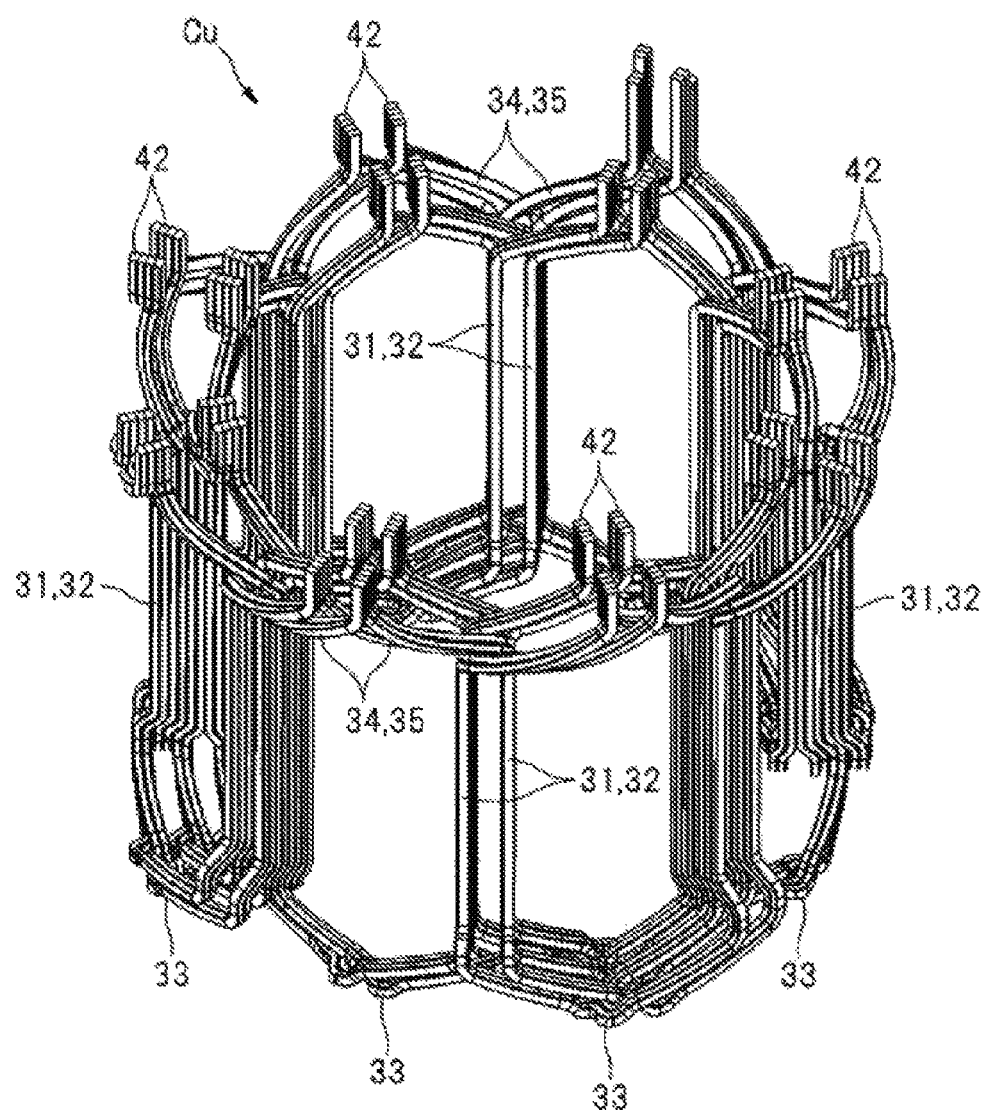
FIG. 6 is a perspective view of the U-phase coil alone.

FIG. 2 is a cross-sectional view of the stator 10 taken along line A-A in FIG. 1. FIG. 3 is a perspective view of exemplary segment coils 30. FIG. 4 is a perspective view of the stator core 15 provided with a U-phase distributed winding coil (hereinafter referred to as U-phase coil Cu). FIG. 5 is a cross-sectional view of the stator core 15 provided with the U-phase coil Cu. FIG. 6 is a perspective view of the U-phase coil Cu alone. The U-phase coil Cu may refer to a distributed winding coil configuring one phase of the three-phase coil SC. As will be described later, the three-phase coil SC may include the U-phase coil Cu, a V-phase distributed winding coil (hereinafter referred to as V-phase coil Cv), and a W-phase distributed winding coil (hereinafter referred to as W-phase coil Cw).

As illustrated in FIG. 2, an inner circumference of the cylindrical stator core 15 may have a plurality of slots S1 to S48 provided at predetermined intervals in a circumferential direction. The slots S1 to S48 may accommodate the segment coils 30 to be described later, and the segment coils 30 may be coupled to each other to configure the three-phase coil SC. In the illustrated example, the slots S1, S2, S7, S8, etc. may accommodate the segment coils 30 included in the U-phase coil Cu, the slots S3, S4, S9, S10, etc. may accommodate the segment coils 30 included in the V-phase coil Cv, and the slots S5, S6, S11, S12, etc. may accommodate the segment coils 30 included in the W-phase coil Cw.

As illustrated in FIG. 3, the segment coil 30 bent into a U-like shape may have a coil side 31 to be accommodated in any slot (e.g., the slot S1) and a coil side 32 to be accommodated in another slot (e.g., the slot S7). The coil side 32 may be distanced from the coil side 31 by a predetermined coil pitch. In one embodiment, the coil sides 31 and 32 may serve as "straight parts". The segment coil 30 may also have a bend 33 and welding ends 34 and 35. The bend 33 may couple the pair of coil sides 31 and 32 to each other. The welding ends 34 and 35 may extend from the pair of coil sides 31 and 32. The segment coil 30 may include rectangular wire including an electrically-conductive material such as copper. The segment coil 30, excluding tips of the welding ends 34 and 35, may be provided with enamel or an insulating film such as a resin film. The bend 33 of the segment coil 30 may have, without being limited to the bend shape illustrated in FIG. 3, any of various bend shapes depending on a position where the segment coil 30 is attached to the stator core 15.

As illustrated in FIG. 4 and FIG. 5, the segment coils 30 each having the pair of coil sides 31 and 32 may be attached to the stator core 15. The pair of coil sides 31 and 32 may be distanced from each other by the predetermined coil pitch (e.g., six slots). As illustrated in FIG. 4, the bend 33 of the segment coil 30 may protrude from a first end face 40 of the stator core 15, and the welding ends 34 and 35 of the segment coil 30 may protrude from a second end face 41 of the stator core 15. The first end face 40 may refer to one end face of the stator core 15, and the second end face 41 may refer to the other end face of the stator core 15. Furthermore, the welding ends 34 and 35 protruding from the second end face 41 of the stator core 15 may be bent to come into contact with the welding ends 34 and 35 of another segment coil 30 included in the U-phase coil Cu. The welding ends 34 and 35 may thus be welded to the welding ends 34 and 35 of the other segment coil 30 in contact with the segment coil 30. In this manner, as illustrated in FIG. 6, the segment coils 30 may be coupled to each other into one electric conductor, and the segment coils 30 may configure the U-phase coil Cu. An end group 42 including the welding ends 34 and 35 joined to each other may be provided with a covering of insulation. Providing a covering of insulation may refer to providing a resin film, for example, to cover an electric conductor. In one embodiment, the end group 42 may serve as a "weld".

Figure 7:
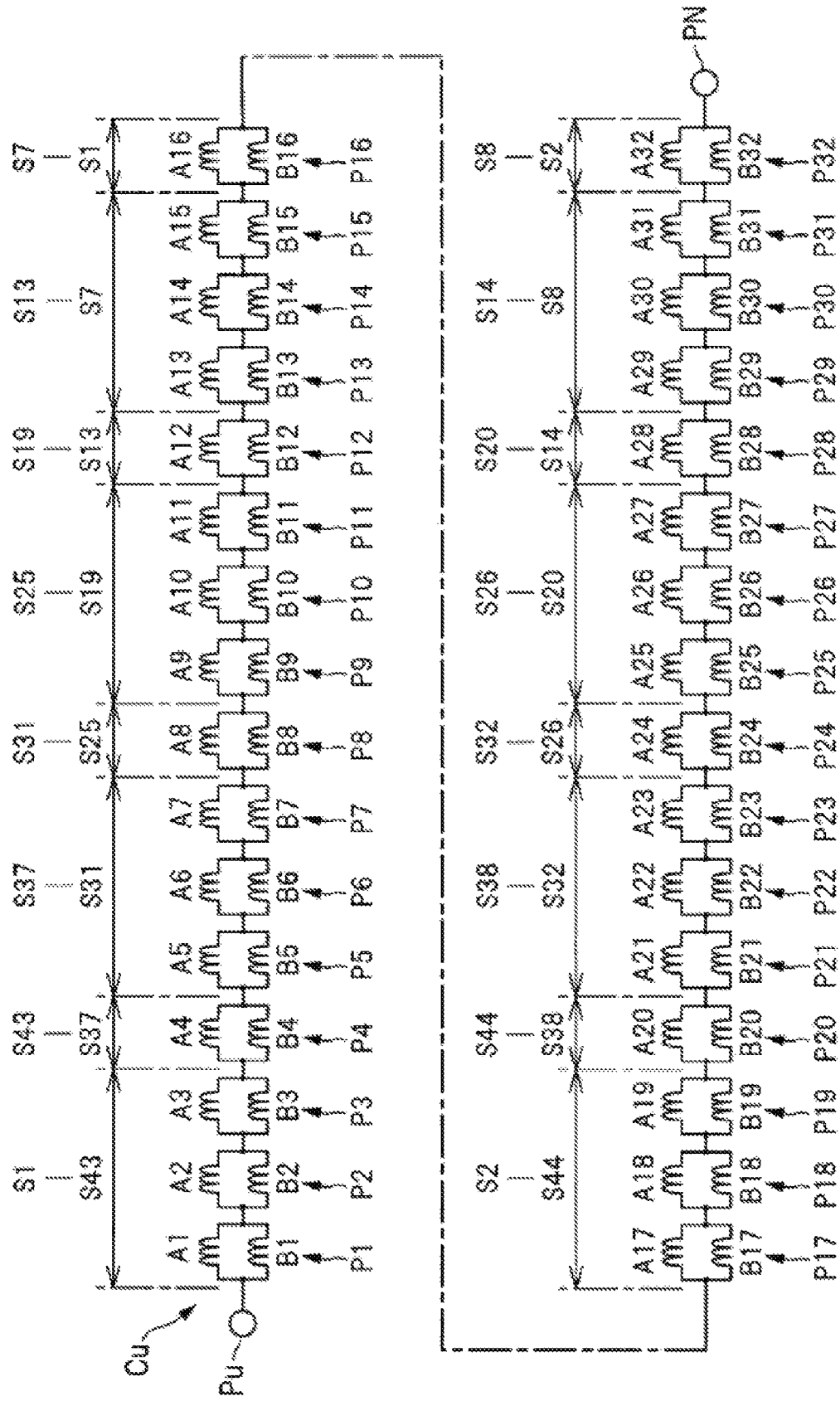
FIG. 7 is a diagram illustrating a coil structure of the U-phase coil.
Figure 8:
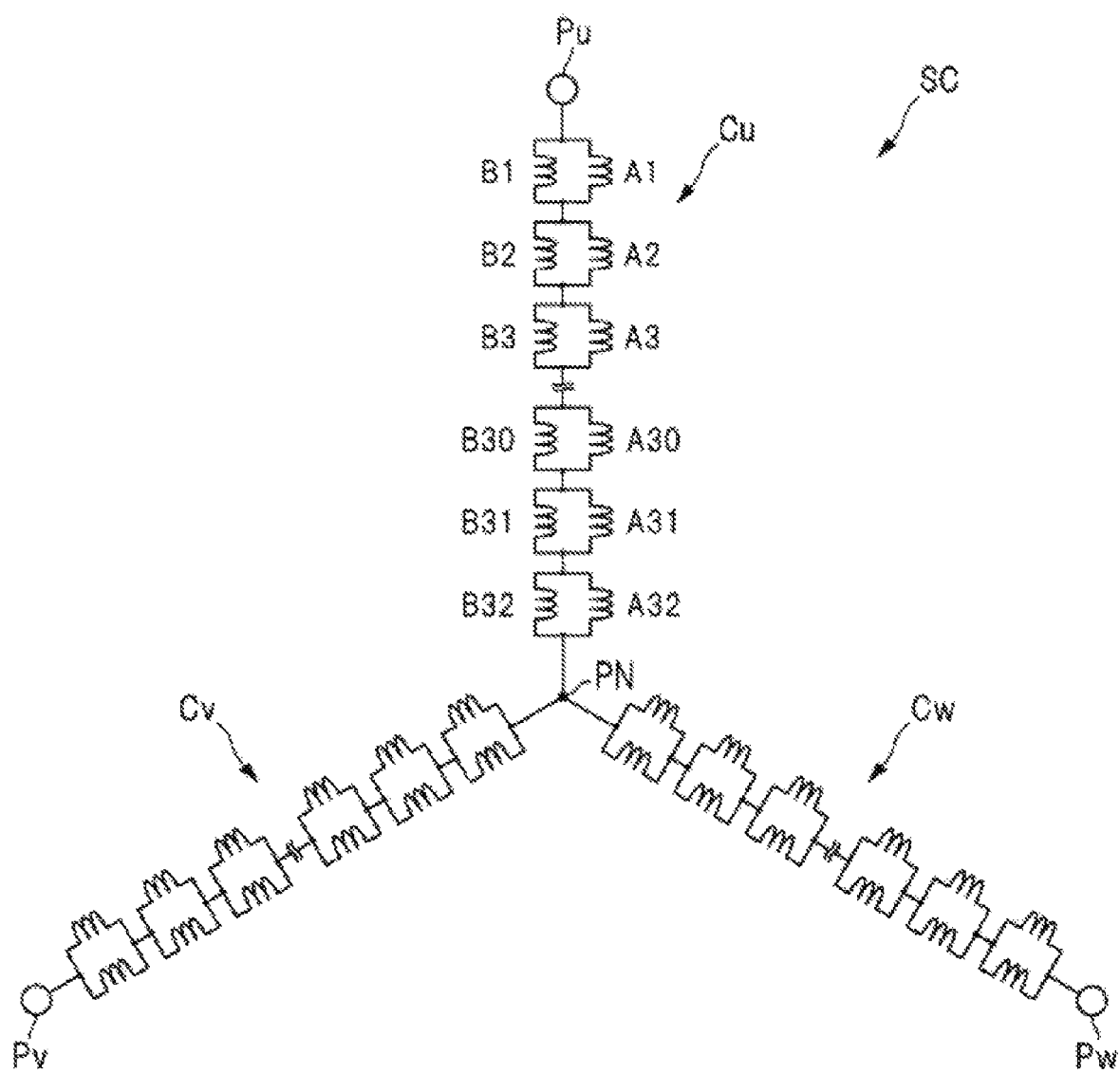
FIG. 8 is a diagram illustrating a connection state of a three-phase coil.

FIG. 7 is a diagram illustrating a coil structure of the U-phase coil Cu. FIG. 8 is a diagram illustrating a connection state of the three-phase coil SC. The following description describes the U-phase coil Cu, but the V-phase coil Cv and the W-phase coil Cw may also have similar coil structures. The above description assigns the segment coils with a numeral "30", whereas the following description assigns the segment coils with numerals "A1 to A32 and B1 to B32" in terms of distinguishing between the individual segment coils.

As illustrated in FIG. 7, the U-phase coil Cu may include a plurality of parallel coils P1 to P32 coupled to each other in series. The individual parallel coils (P1, etc.) may include a pair of segment coils (A1, B1, etc.) coupled to each other in parallel. Furthermore, the pair of segment coils (A1, B1, etc.) included in the individual parallel coils (P1, etc.) may be accommodated in the same pair of slots (S1, S43, etc.). As illustrated in FIG. 7, for example, the pair of segment coils A1 and B1 included in the parallel coil P1 may be accommodated in the same pair of slots S1 and S43. For example, the pair of segment coils A10 and B10 included in the parallel coil P10 may be accommodated in the same pair of slots S19 and S25. For example, the pair of segment coils A20 and B20 included in the parallel coil P20 may be accommodated in the same pair of slots S38 and S44.

As illustrated in FIG. 8, the power line terminal Pu may be coupled to one end of the U-phase coil Cu, and a neutral terminal PN may be coupled to the other end of the U-phase coil Cu. Similarly, the power line terminal Pv may be coupled to one end of the V-phase coil Cv, and the neutral terminal PN may be coupled to the other end of the V-phase coil Cv. Similarly, the power line terminal Pw may be coupled to one end of the W-phase coil Cw, and the neutral terminal PN may be coupled to the other end of the W-phase coil Cw. The U-phase coil Cu, the V-phase coil Cv, and the W-phase coil Cw may be coupled to each other via the neutral terminal PN, and the coils Cu, Cv, and Cw of the respective phases may configure the three-phase coil SC.

As illustrated in FIG. 7 described above, in the U-phase coil Cu serving as one phase of the three-phase coil SC, the segment coils (A1, B1, etc.) included in the individual parallel coils (P1, etc.) may be accommodated in the same pair of slots (S1, S43, etc.). This makes it possible to prevent occurrence of a potential difference between the segment coils (A1, B1, etc.), which helps to prevent occurrence of circulating current in the individual parallel coils (P1, etc.). In other words, it is possible to make electromotive force match between the segment coils included in the individual parallel coils. This helps to prevent occurrence of circulating current in the individual parallel coils. The electromotive force may be generated when the rotor is rotated. Also in the V-phase coil Cv and the W-phase coil Cw having similar coil structures, it is possible to prevent occurrence of circulating current in the individual parallel coils.

[Structure of U-phase Coil]

Figure 9:
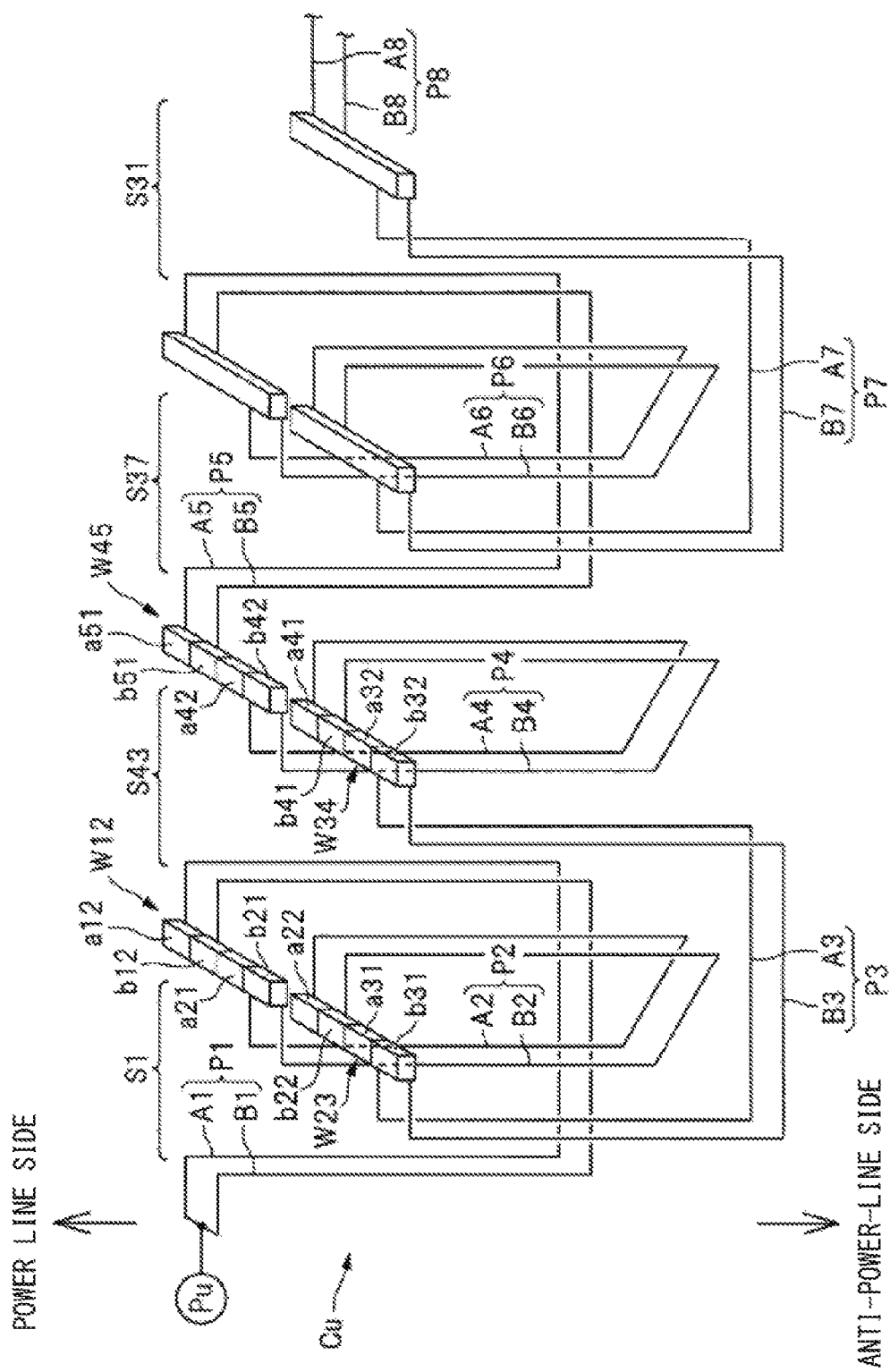
FIG. 9 is a diagram illustrating a connection relationship between segment coils included in a portion of the U-phase coil.
Figure 10:
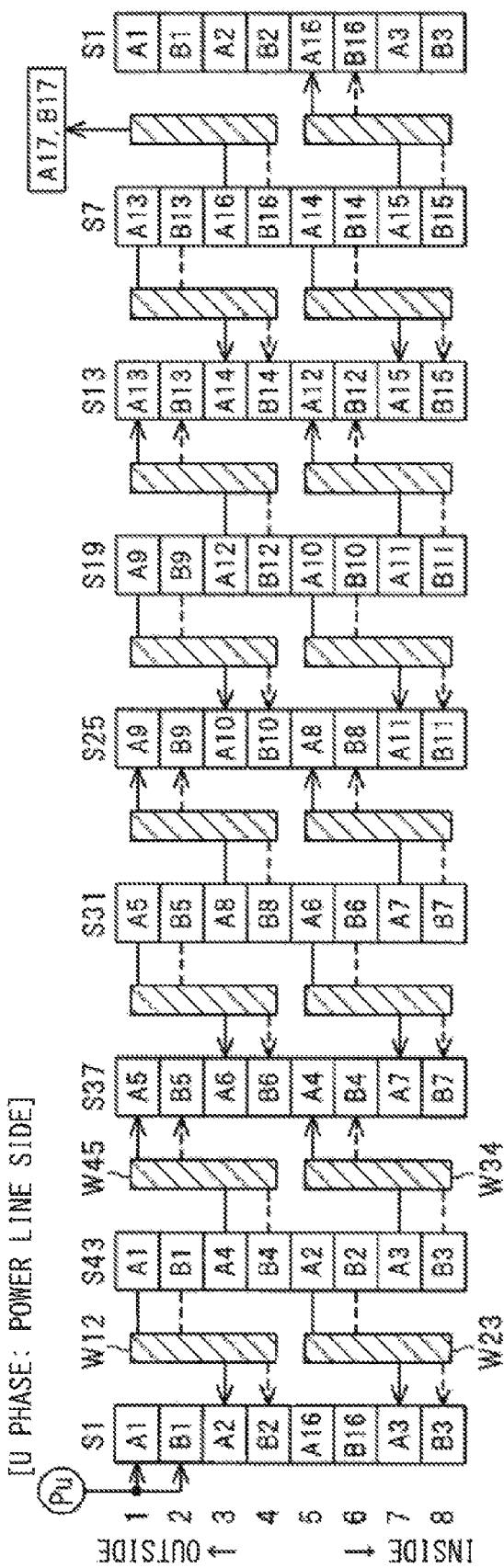
FIG. 10 is a diagram illustrating positions where segment coils are accommodated in slots of the stator core.
Figure 10:
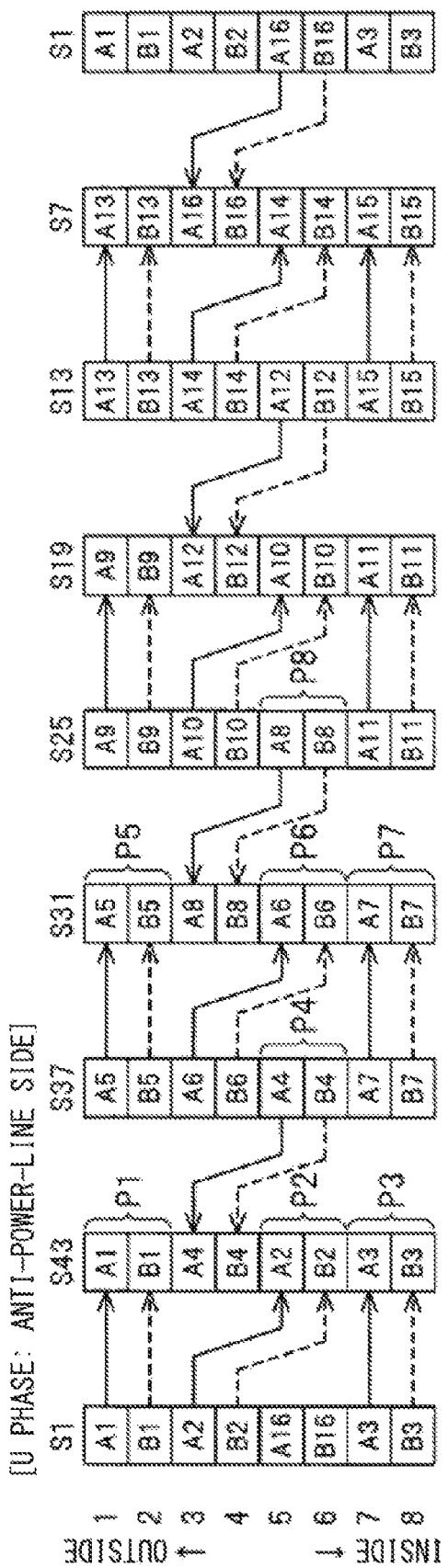
Figure 11:
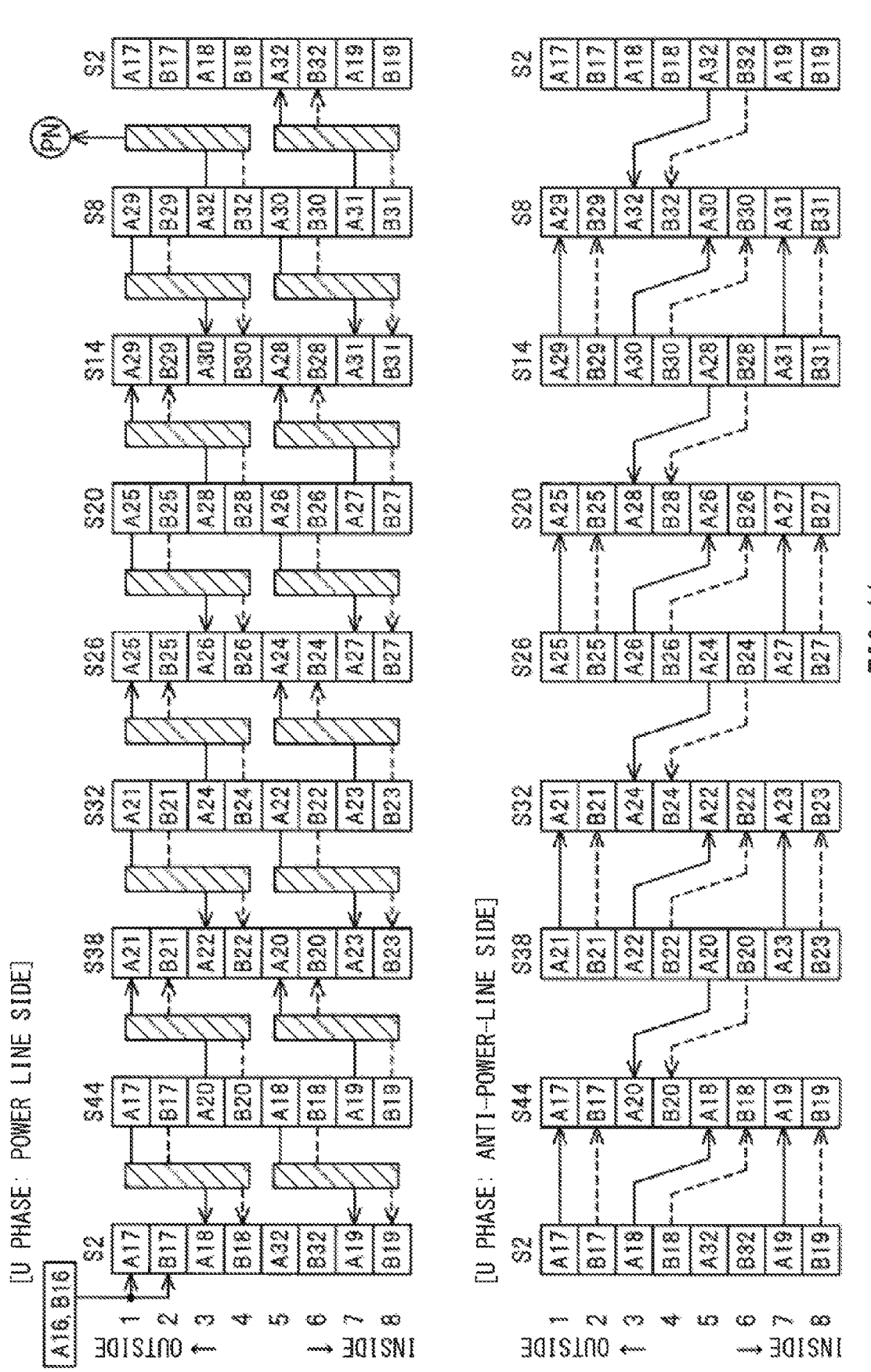
FIG. 11 is a diagram illustrating positions where segment coils are accommodated in slots of the stator core.
Figure 12:
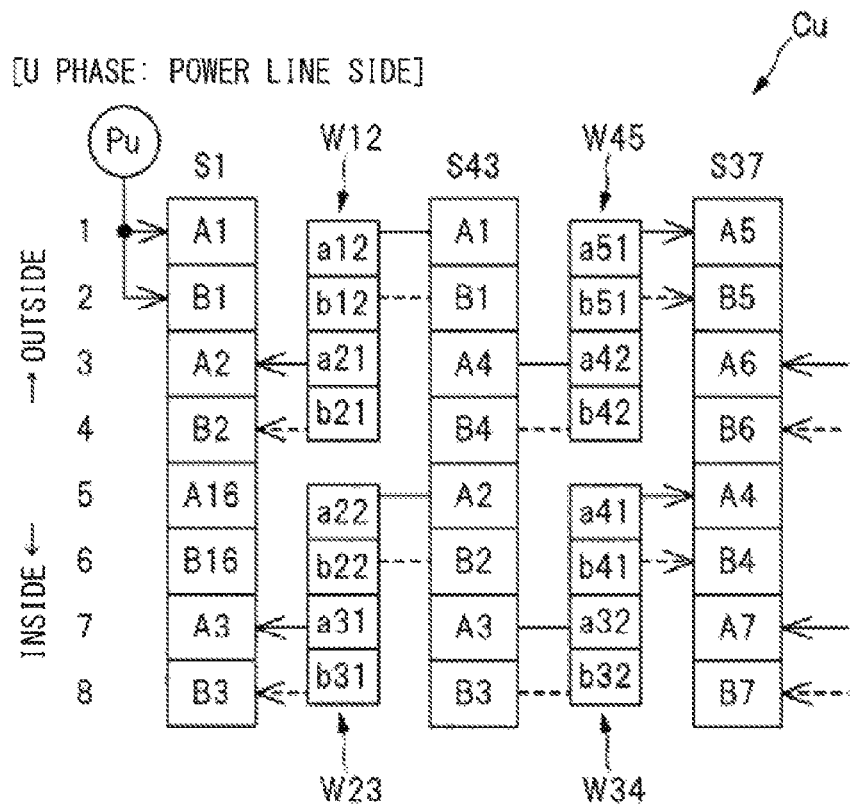
FIG. 12 is an enlarged view of the positions where the segment coils are accommodated in the slots of the stator core.
Figure 12:
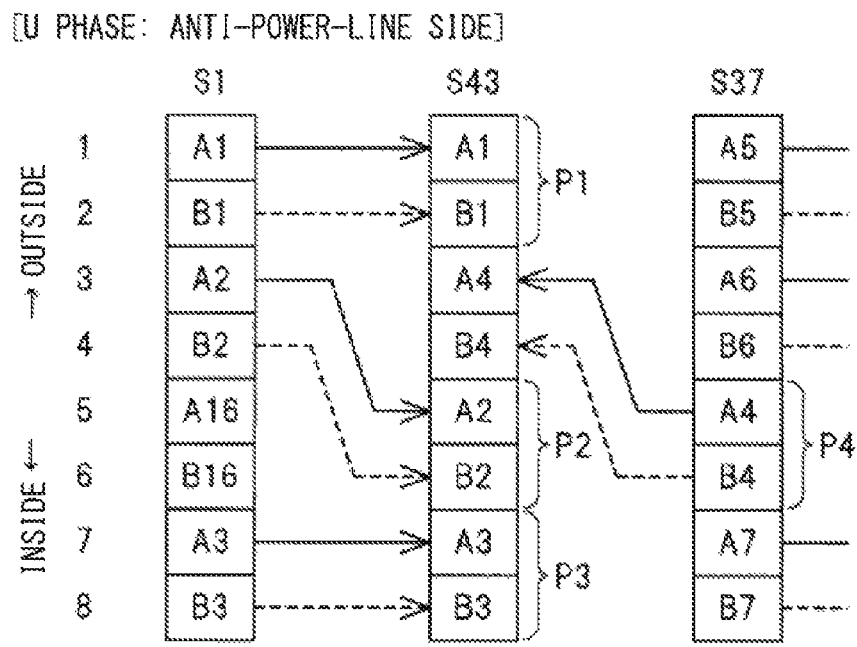

Now, a structure of the U-phase coil Cu will be described in detail. FIG. 9 is a diagram illustrating a connection relationship between the segment coils A1 to A8 and B1 to B8 included in a portion of the U-phase coil Cu. FIG. 10 is a diagram illustrating positions where the segment coils A1 to A16 and B1 to B16 are accommodated in the slots S1, S7, etc. of the stator core 15. FIG. 11 is a diagram illustrating positions where the segment coils A17 to A32 and B17 to B32 are accommodated in the slots S2, S8, etc. of the stator core 15. FIG. 12 is an enlarged view of the positions where the segment coils A1 to A7 and B1 to B7 are accommodated in the slots S1, S37, and S43 of the stator core 15.

The "power line side" illustrated in FIG. 10 to FIG. 12 may refer to, as illustrated in FIG. 1 and FIG. 4, a side on which the welding ends 34 and 35 of the segment coil 30 are positioned, i.e., a side on which the power line terminals Pu, Pv, and Pw are positioned. The "anti-power-line side" illustrated in FIG. 10 and other drawings may refer to, as illustrated in FIG. 1 and FIG. 4, a side opposite to the power line side, i.e., a side on which the bend 33 of the segment coil 30 is positioned. The "inside" illustrated in FIG. 10 and FIG. 11 may refer to, as illustrated in FIG. 5, the inside of the stator core 15 in a radial direction, and the "outside" illustrated in FIG. 10 and other drawings may refer to the outside of the stator core 15 in the radial direction.

As illustrated in FIG. 7, the U-phase coil Cu may have a coil structure in which a connection pattern of four parallel coils (e.g., P1 to P4) is repeated. Hereinafter, the connection pattern of the parallel coils P1 to P4 will be described. As illustrated in FIG. 9 and FIG. 10, the segment coils A1 to A3 and B1 to B3 included in the parallel coils P1 to P3 may be inserted into the same pair of slots S1 and S43. The segment coils A4 and B4 included in the parallel coil P4 may be inserted into the same pair of slots S43 and S37, including the slot S43 shared by the parallel coils P1 to P3.

As illustrated in FIG. 10 and FIG. 12, the segment coils A1 and B1 of the parallel coil P1 may be accommodated in first and second positions (outside positions) of the slots S1 and S43. The segment coils A2 and B2 of the parallel coil P2 may be accommodated in third and fourth positions of the slot S1 and fifth and sixth positions of the slot S43. The segment coils A3 and B3 of the parallel coil P3 may be accommodated in seventh and eighth positions (inside positions) of the slots S1 and S43. The segment coils A4 and B4 of the parallel coil P4 may be accommodated in third and fourth positions of the slot S43 and fifth and sixth positions of the slot S37.

As illustrated in FIG. 9 and FIG. 12, on the power line side, welding ends a12 and b12 of the segment coils A1 and B1 may protrude from the slot S43, and welding ends a21 and b21 of the segment coils A2 and B2 may protrude from the slot S1. The welding ends a12 and b12 and the welding ends a21 and b21 may overlap each other to be welded at one place as an end group W12. Similarly, on the power line side, welding ends a22 and b22 of the segment coils A2 and B2 may protrude from the slot S43, and welding ends a31 and b31 of the segment coils A3 and B3 may protrude from the slot S1. The welding ends a22 and b22 and the welding ends a31 and b31 may overlap each other to be welded at one place as an end group W23.

Furthermore, on the power line side, welding ends a32 and b32 of the segment coils A3 and B3 may protrude from the slot S43, and welding ends a41 and b41 of the segment coils A4 and B4 may protrude from the slot S37. The welding ends a32 and b32 and the welding ends a41 and b41 may overlap each other to be welded at one place as an end group W34. Similarly, on the power line side, welding ends a42 and b42 of the segment coils A4 and B4 may protrude from the slot S43, and welding ends a51 and b51 of the segment coils A5 and B5 may protrude from the slot S37. The welding ends a42 and b42 and the welding ends a51 and b51 may overlap each other to be welded at one place as an end group W45.

Thus coupling the segment coils A1 to A5 and B1 to B5 via the end groups W12, W23, W34, and W45 makes it possible to form the parallel coils P1 to P4, and couple the parallel coils P1 to P4 to each other in series. As illustrated in FIG. 10 and FIG. 11, the connection pattern of the parallel coils P1 to P4 may be repeated for each four parallel coils (P5 to P8, P9 to P12, etc.), which makes it possible to form the U-phase coil Cu including the parallel coils P1 to P32.

[Downsizing of Coil End]

As described above with reference to FIG. 9 and FIG. 12, coupling the segment coils A1 to A5 and B1 to B5 via the end groups W12, W23, W34, and W45 makes it possible to form the parallel coils P1 to P4, and couple the parallel coils P1 to P4 to each other in series. Thus welding four welding ends (a12, b12, a21, b21, etc.) as one end group (W12, etc.) makes it possible to reduce the number of the end groups (W12, etc.) serving as welds, which helps to downsize a second coil end Ce2 including the end groups (W12, etc.). The second coil end Ce2 will be described later. It may be necessary to keep insulation distance between the end groups 42. Therefore, an increase in the number of the end groups 42 makes it more likely for the end groups 42 to be disposed on the outside (direction of an arrow α) in the radial direction, as illustrated in FIG. 4. Reducing the number of the end groups 42 makes it possible to prevent the second coil end Ce2 from expanding to the outside in the radial direction. Furthermore, a significant reduction in the number of welds makes it possible to reduce manufacturing cost of the stator 10.

The end group W12 will be taken as an example for description. As illustrated in FIG. 12, the coil sides of the segment coils A1 and B1 of the parallel coil P1 may be disposed adjacent to each other in the slot S43, and the coil sides of the segment coils A2 and B2 of the parallel coil P2 may be disposed adjacent to each other in the slot S1. Thus, in forming the parallel coil P1 using the segment coils A1 and B1, it is possible to easily overlap and couple the welding ends a12 and b12. In forming the parallel coil P2 using the segment coils A2 and B2, it is possible to easily overlap and couple the welding ends a21 and b21. It is thus possible to easily overlap and weld the welding ends a12, b12, a21, and b21. This makes it less likely for the individual welding ends a12, b12, a21, and b21 to overlap complicatedly, making it possible to downsize the second coil end Ce2.

In regard to the end group W12, the segment coils A1 and B1 of the parallel coil P1 may be disposed at first and second positions in the slot S43, and the segment coils A2 and B2 of the parallel coil P2 may be disposed at third and fourth positions in the slot S1. Thus disposing the coils A1 and B1 and the coils A2 and B2 at positions shifted in the radial direction makes it possible to easily overlap and couple the welding ends a12, b12, a21, and b21. Even in a case of coupling the parallel coils P1 and P2 to each other in series, it is thus possible to easily overlap and weld the welding ends a12, b12, a21, and b21. This makes it less likely for the individual welding ends a12, b12, a21, and b21 to overlap complicatedly, making it possible to downsize the second coil end Ce2.

[Inner Diameter of Coil End]

Figure 13:
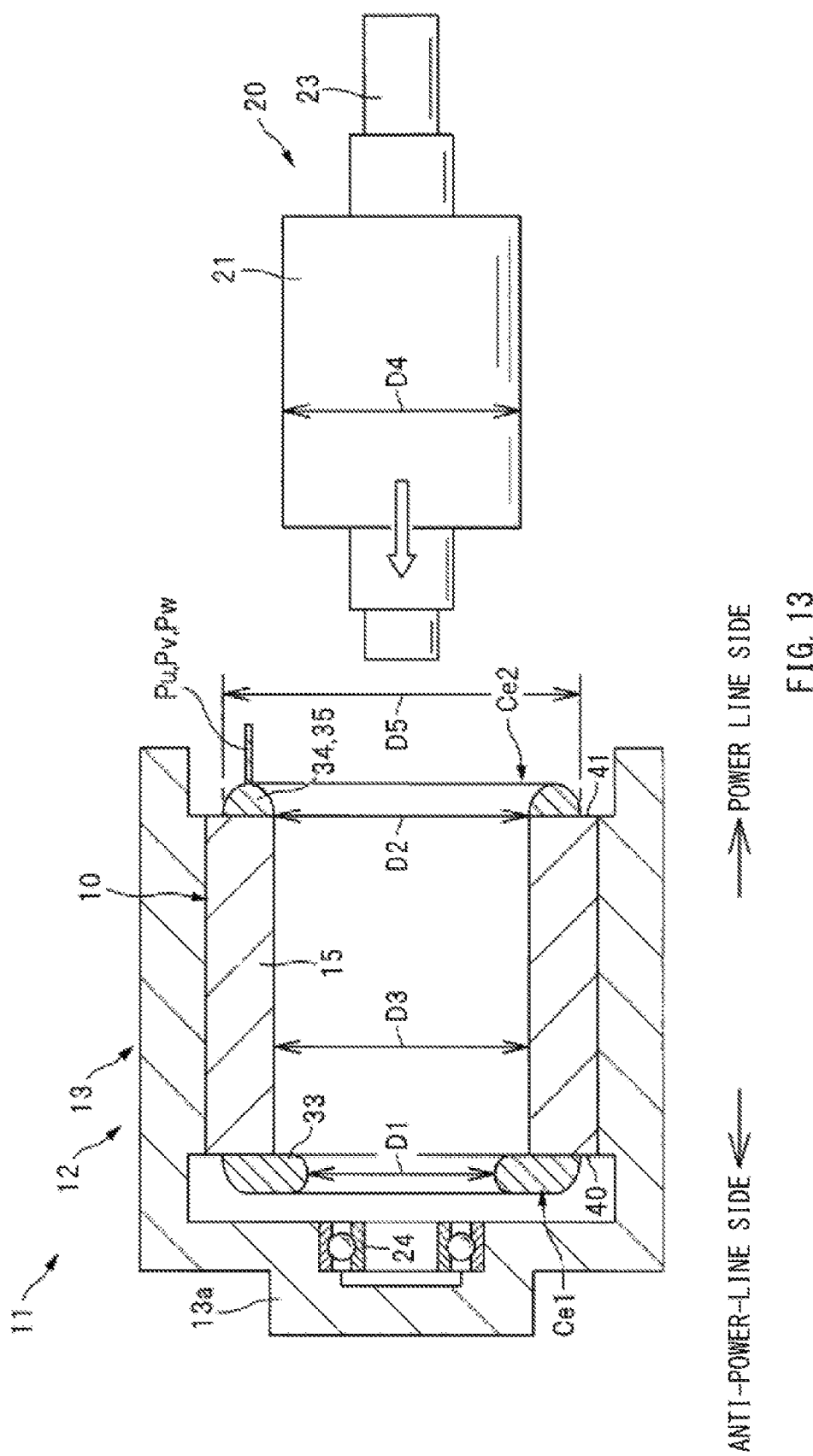
FIG. 13 is a diagram illustrating a process of assembling the stator and a rotor.

FIG. 13 is a diagram illustrating a process of assembling the stator 10 and the rotor 20. As illustrated in FIG. 13, the stator core 15 of the stator 10 may be provided with the three-phase coil SC including the coils Cu, Cv, and Cw of the respective phases. The three-phase coil SC, i.e., the coils Cu, Cv, and Cw of the respective phases, may have a first coil end Ce1 and the second coil end Ce2. The first coil end Ce1 may include the bends 33 protruding from the first end face 40 of the stator core 15. The second coil end Ce2 may include the welding ends 34 and 35 protruding from the second end face 41 of the stator core 15. The first coil end Ce1 provided on the anti-power-line side may have an inner diameter D1 that is smaller than an inner diameter D2 of the second coil end Ce2 provided on the power line side. The inner diameter D1 of the first coil end Ce1 may be smaller than an inner diameter D3 of the stator core 15. Furthermore, the inner diameter D1 of the first coil end Ce1 may be smaller than an outer diameter D4 of the rotor 20. The inner diameter D2 of the second coil end Ce2 may be larger than the outer diameter D4 of the rotor 20.

As illustrated in FIG. 10 and FIG. 11, the number of the segment coils A1 to A32 and B1 to B32 spanning the slots may vary on the anti-power-line side where the first coil end Ce1 is positioned. In contrast, the number of the segment coils A1 to A32 and B1 to B32 spanning the slots may be set uniform on the power line side where the second coil end Ce2 is positioned. On the anti-power-line side where the first coil end Ce1 is positioned, the segment coils A1 to A32 and B1 to B32 are likely to be disposed in complicated arrangement, which tends to result in increased volume of the first coil end Ce1. In contrast, on the power line side where the second coil end Ce2 is positioned, it is possible to dispose the segment coils A1 to A32 and B1 to B32 in simple arrangement, making it possible to reduce volume of the second coil end Ce2.

Accordingly, in the stator 10 according to an example embodiment of the technology, the first coil end Ce1 may be allowed to expand to the inside of the stator core 15 in the radial direction, whereas the second coil end Ce2 may be reduced in volume to make an outer diameter D5 of the second coil end Ce2 smaller. This makes it possible to avoid the second coil end Ce2 from expanding to the outside in the radial direction, making it possible to easily keep insulation distance from the housing body 13, in other words, to downsize the housing body 13. This helps to make a build of the electric rotating machine 11 smaller. In reaction to making the second coil end Ce2 smaller, the first coil end Ce1 may be made larger. Even in such a case, expanding the first coil end Ce1 to the inside in the radial direction makes it possible to keep the build of the electric rotating machine 11 small. Furthermore, expanding the first coil end Ce1 to the inside in the radial direction can make the inner diameter D1 of the first coil end Ce1 smaller than the inner diameter D3 of the stator core 15 and the outer diameter D4 of the rotor 20. Even in such a case, it is possible to appropriately assemble the electric rotating machine 11 owing to the rotor 20 that is to be inserted into the stator core 15 from the second coil end Ce2 side, as indicated by a hollow arrow in FIG. 13.

The technology is not limited to the example embodiments, and various modifications may be made without departing from the scope of the technology.

In the above description, one parallel coil may include two segment coils. Without being limited to this example, one parallel coil may include three or more segment coils that are coupled to each other in parallel. For example, in a case where one parallel coil includes three segment coils, three segment coils may be disposed adjacent to each other in the same pair of slots. In the case where one parallel coil includes three segment coils, six welding ends may configure one end group.

In the above description, the stator core 15 including 48 slots may be used. Without being limited to this example, a stator core to be used may include another number of slots. In the above description, the U-phase coil Cu, the V-phase coil Cv, and the W-phase coil Cw may be coupled in wye connection. Without being limited to this example, the U-phase coil Cu, the V-phase coil Cv, and the W-phase coil Cw may be coupled in delta connection. In the above description, the stator coil SC may include the U-phase coil Cu, the V-phase coil Cv, and the W-phase coil Cw. Without being limited to the three-phase distributed winding coil, a stator coil may include a two-phase distributed winding coil, for example. In the above description, welding may be performed after the three-phase coil SC is attached to the stator core 15. Without being limited to this example, in a case where the stator core 15 is divided, the stator core 15 may be attached to the three-phase coil SC that has been assembled and subjected to welding.

As described above, at least one embodiment of the technology makes it possible to downsize a stator in an electric rotating machine. This helps to downsize the electric rotating machine as a whole.

To further downsize a stator provided in an electric rotating machine, it is effective to make a coil end of a stator coil smaller. To make the coil end of the stator coil smaller in the stator including segment coils, it is important to dispose the segment coils in appropriate arrangement in slots of a stator core. Accordingly, two or more of the segment coils that are included in each of parallel coils are disposed adjacent to each other in the radial direction in the same pair of slots. This enables the segment coils to be disposed without being bent complicatedly. The appropriate arrangement of the segment coils makes it possible to further downsize the stator.

The invention claimed is:

1. A stator to be provided in an electric rotating machine, the stator comprising:
   a stator core having a plurality of slots; and
   a distributed winding coil including a plurality of segment coils coupled to each other, the distributed winding coil including:

a first parallel coil including two or more parallel coils that includes:
  a first segment coil of the segment coils, straight parts of the first segment coil configured to be inserted into:
    a first slot of the plurality of the slots; and
    a second slot far from the first slot by a predetermined number of slots in a circumferential direction; and
  a second segment coil of the segment coils, straight parts of the second segment coil configured to be inserted into the first slot and the second slot, the second segment coil arranged adjacent to the first segment coil, and the second segment coil coupled with the first segment coil in parallel,
a second parallel coil including two or more parallel coils that includes:
  a third segment coil of the segment coils, straight parts of the third segment coil configured to be inserted into:
    a third slot of the plurality of the slots; and
    a fourth slot far from the third slot by a predetermined number of slots in a circumferential direction; and
  a fourth segment coil of the segment coils, straight parts of the fourth segment coil configured to be inserted into the third slot and the fourth slot, the fourth segment coil arranged adjacent to the third segment coil, and the fourth segment coil coupled with the third segment coil in parallel; and
a third parallel coil including a pair of parallel coil that includes:
  a fifth segment coil of the segment coils, straight parts of the fifth segment coil configured to be inserted into the second slot and the third slot; and
  a sixth segment coil of the segment coils, straight parts of the sixth segment coil configured to be inserted into the second slot and the third slot, the sixth segment coil arranged adjacent to the fifth segment coil, and the sixth segment coil coupled with the fifth segment coil in parallel,
wherein the first parallel coil is configured to be coupled, in series via the third parallel coil, with the second parallel coil.

2. The stator according to claim 1, wherein each of the segment coils has a pair of straight parts disposed in the pair of slots, the pair of straight parts including a first straight part and a second straight part, and
wherein the first straight parts of the two or more segment coils included in each of the parallel coils are disposed adjacent to each other in the radial direction in one of the pair of slots, and the second straight parts of the two or more segment coils included in each of the parallel coils are disposed adjacent to each other in the radial direction in the other of the pair of slots.

3. The stator according to claim 2, wherein each of the segment coils has:
  the pair of straight parts disposed in the pair of slots;
  a bend coupling the pair of straight parts to each other and protruding from a first end face of the stator core; and
  welding ends extending from the pair of straight parts and protruding from a second end face of the stator core, and
wherein the distributed winding coil further includes a weld provided between two of the parallel coils, the two parallel coils being coupled to each other in series, the weld joining the welding ends extending from one of the two parallel coils and the welding ends extending from the other of the two parallel coils together.

4. The stator according to claim 3, wherein each of the segment coils has:
  the pair of straight parts disposed in the pair of slots;
  the bend coupling the pair of straight parts to each other and protruding from the first end face of the stator core; and
  the welding ends extending from the pair of straight parts and protruding from the second end face of the stator core,
wherein the distributed winding coil has a first coil end and a second coil end, the first coil end including the bends protruding from the first end face of the stator core, the second coil end including the welding ends protruding from the second end face of the stator core, and
wherein the first coil end has an inner diameter that is smaller than an inner diameter of the second coil end.

5. The stator according to claim 4, wherein the inner diameter of the first coil end is smaller than an inner diameter of the stator core.

6. An electric rotating machine comprising:
the stator according to claim 3; and
a rotor accommodated in the stator core and rotatable with respect to the stator,
wherein the rotor includes
  a rotor shaft, and
  a rotor core attached on an outer circumference of the rotor shaft and including a plurality of permanent magnets arranged in a circumferential direction.

7. The stator according to claim 2, wherein each of the segment coils has:
  the pair of straight parts disposed in the pair of slots;
  a bend coupling the pair of straight parts to each other and protruding from a first end face of the stator core; and
  welding ends extending from the pair of straight parts and protruding from a second end face of the stator core,
wherein the distributed winding coil has a first coil end and a second coil end, the first coil end including the bends protruding from the first end face of the stator core, the second coil end including the welding ends protruding from the second end face of the stator core, and
wherein the first coil end has an inner diameter that is smaller than an inner diameter of the second coil end.

8. The stator according to claim 7, wherein the inner diameter of the first coil end is smaller than an inner diameter of the stator core.

9. The stator according to claim 8, wherein the inner diameter of the first coil end is smaller than an outer diameter of a rotor to be accommodated in the stator core.

10. The stator according to claim 7, wherein the inner diameter of the first coil end is smaller than an outer diameter of a rotor to be accommodated in the stator core.

11. An electric rotating machine comprising:
the stator according to claim 2; and
a rotor accommodated in the stator core and rotatable with respect to the stator,
wherein the rotor includes
  a rotor shaft, and
  a rotor core attached on an outer circumference of the rotor shaft and including a plurality of permanent magnets arranged in a circumferential direction.

12. The stator according to claim 1, wherein
each of the segment coils has:
- a pair of straight parts disposed in the pair of slots;
- a bend coupling the pair of straight parts to each other and protruding from a first end face of the stator core; and
- welding ends extending from the pair of straight parts and protruding from a second end face of the stator core, and wherein the distributed winding coil further includes a weld provided between two of the parallel coils, the two parallel coils being coupled to each other in series, the weld joining the welding ends extending from one of the two parallel coils and the welding ends extending from the other of the two parallel coils together.

13. The stator according to claim 12, wherein
each of the segment coils has:
- the pair of straight parts disposed in the pair of slots;
- the bend coupling the pair of straight parts to each other and protruding from the first end face of the stator core; and
- the welding ends extending from the pair of straight parts and protruding from the second end face of the stator core, wherein the distributed winding coil has a first coil end and a second coil end, the first coil end including the bends protruding from the first end face of the stator core, the second coil end including the welding ends protruding from the second end face of the stator core, and wherein the first coil end has an inner diameter that is smaller than an inner diameter of the second coil end.

14. The stator according to claim 13, wherein the inner diameter of the first coil end is smaller than an inner diameter of the stator core.

15. An electric rotating machine comprising:
the stator according to claim 12; and
a rotor accommodated in the stator core and rotatable with respect to the stator,
wherein the rotor includes
- a rotor shaft, and
- a rotor core attached on an outer circumference of the rotor shaft and including a plurality of permanent magnets arranged in a circumferential direction.

16. The stator according to claim 1, wherein
each of the segment coils has:
- a pair of straight parts disposed in the pair of slots;
- a bend coupling the pair of straight parts to each other and protruding from a first end face of the stator core; and
- welding ends extending from the pair of straight parts and protruding from a second end face of the stator core, wherein the distributed winding coil has a first coil end and a second coil end, the first coil end including the bends protruding from the first end face of the stator core, the second coil end including the welding ends protruding from the second end face of the stator core, wherein the first coil end has an inner diameter that is smaller than an inner diameter of the second coil end, and wherein a shape of the bend portion is set depending on a position where a segment coil of the segment coils is attached to the stator core.

17. The stator according to claim 16, wherein the inner diameter of the first coil end is smaller than an inner diameter of the stator core.

18. The stator according to claim 17, wherein the inner diameter of the first coil end is smaller than an outer diameter of a rotor to be accommodated in the stator core.

19. The stator according to claim 16, wherein the inner diameter of the first coil end is smaller than an outer diameter of a rotor to be accommodated in the stator core.

20. An electric rotating machine comprising:
the stator according to claim 1; and
a rotor accommodated in the stator core and rotatable with respect to the stator,
wherein the rotor includes
- a rotor shaft, and
- a rotor core attached on an outer circumference of the rotor shaft and including a plurality of permanent magnets arranged in a circumferential direction.

* * * * *